(12) United States Patent
Kelly et al.

(10) Patent No.: US 7,920,142 B2
(45) Date of Patent: Apr. 5, 2011

(54) IDENTIFYING ASYMPTOTES IN APPROXIMATED CURVES AND SURFACES

(75) Inventors: Luke Kelly, Bellevue, WA (US); Jinsong Yu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 698 days.

(21) Appl. No.: 11/782,661

(22) Filed: Jul. 25, 2007

(65) Prior Publication Data

US 2009/0027393 A1    Jan. 29, 2009

(51) Int. Cl.
*G06T 11/20* (2006.01)
*G09G 5/00* (2006.01)

(52) U.S. Cl. .......... 345/442; 345/440; 345/619
(58) Field of Classification Search .......... 345/441, 345/442
See application file for complete search history.

(56) References Cited

U.S. PATENT DOCUMENTS

| | | | |
|---|---|---|---|
| 6,489,961 B1 * | 12/2002 | Baxter et al. | 345/424 |
| 6,654,015 B1 * | 11/2003 | Arnold | 345/441 |
| 6,674,435 B1 * | 1/2004 | Payne et al. | 345/442 |
| 6,704,013 B2 * | 3/2004 | Hosea | 345/440 |
| 7,212,205 B2 * | 5/2007 | Uesaki et al. | 345/423 |
| 7,432,926 B1 * | 10/2008 | Cherkas | 345/440 |
| 7,595,801 B1 * | 9/2009 | Cherkas | 345/440 |
| 2003/0020710 A1 * | 1/2003 | Biermann et al. | 345/420 |
| 2008/0036755 A1 * | 2/2008 | Bae et al. | 345/418 |
| 2008/0303810 A1 * | 12/2008 | Bae et al. | 345/419 |

* cited by examiner

*Primary Examiner* — M Good Johnson
(74) *Attorney, Agent, or Firm* — Alleman Hall McCoy Russell & Tuttle LLP (57) ABSTRACT

Systems and methods for identifying asymptotes in approximated geometric forms are provided. One disclosed method includes identifying a set of data points that represent an approximated geometric form. The data points may be organized into segments. The method may further include determining a visible range of the geometric form to display. The method may further include looping through successive segments of the approximated geometric form, and on each loop, for a current segment, making a decision whether to draw the current segment based upon a prediction of whether the current segment traverses an asymptote within the visible range. The method may further include displaying on a graphical user interface of a computing device, a graph of the segments of the geometric form in the visible range, the graph not including those segments that were decided not be drawn.

15 Claims, 8 Drawing Sheets

DATA POINTS A AND B OUTSIDE VISIBLE RANGE

Fig. 6

DATA POINT A OUTSIDE AND DATA POINT B INSIDE VISIBLE RANGE

IDENTIFYING ASYMPTOTES IN APPROXIMATED CURVES AND SURFACES

BACKGROUND

Computer algebra systems executed on computing devices such as personal computers and graphing calculators are configured to graph mathematical concepts such as functions, equations, and parametric functions. When creating these graphs, particularly for computing devices that have high resolution displays, many computer algebra systems use sampling to reduce the number of data points required to render a graph, which in turn increases the speed at which a graph can be rendered. This sampling can result in approximation errors when incorrect assumptions are made by the computer algebra system about the continuity of sample points. Perhaps the most common of these approximation errors occurs as a line or surface connecting two points or regions, which in actuality are separated by an asymptote, and thus should not be connected.

Figure 1:
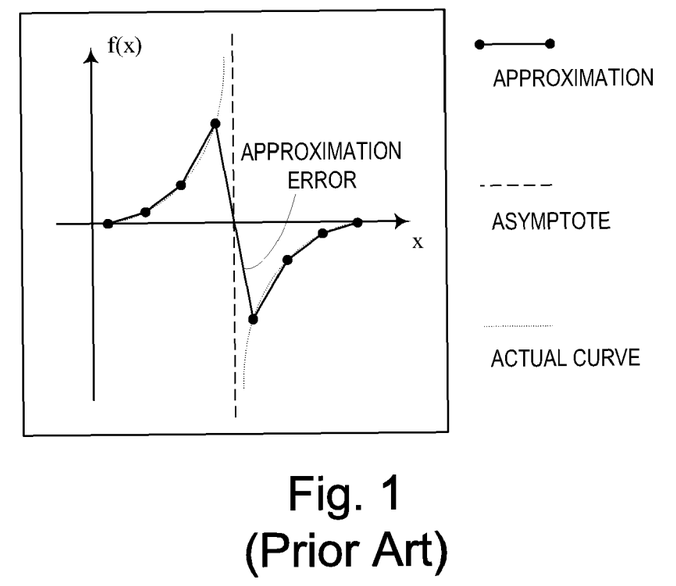
FIG. 1 is a graph produced according to one prior art method for graphing of a two dimensional function, with an approximation error shown as a line that erroneously traverses an asymptote.
Figure 2:
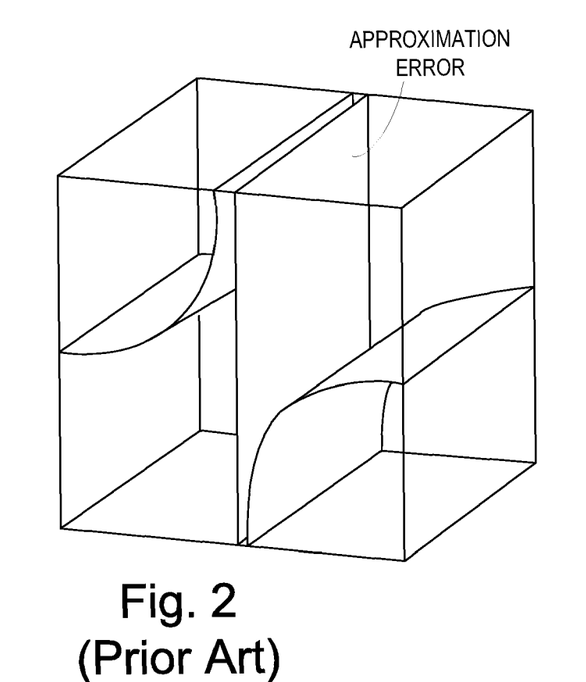
FIG. 2 is a graph produced according to one prior art method for graphing of a three dimensional function, with an approximation error shown as a vertical plane that erroneously traverses an asymptote.

A first example of such an approximation error in a two dimensional graph is illustrated in FIG. 1. The approximation error in FIG. 1 is due to an incorrect assumption that was made about the continuity of the curve between two points on opposite sides of an asymptote. The result is that the graph of the approximated curve, shown in solid lines, greatly deviates from the actual curve, shown in dotted lines. A second example of such an approximation error in a three dimensional graph of a surface is shown in FIG. 2. The approximation error of FIG. 2 appears as a plane connecting to disjointed parts of the surface. It will be appreciated that there is no vertical plane in the actual function, but a plane is displayed in the graph due to the approximation error.

These approximation errors can be frustrating to students, engineers, and scientists alike, and present a barrier to understanding mathematical concepts. Further, these errors may undesirably erode trust in the accuracy of computer algebra systems.

SUMMARY

Systems and methods for identifying asymptotes in approximated geometric forms are provided. One disclosed method includes identifying a set of data points that represent an approximated geometric form. The data points may be organized into segments of the approximated geometric form. The method may further include determining a visible range of the geometric form to display. The method may further include looping through successive segments of the approximated geometric form, and on each loop, for a current segment, making a decision whether to draw the current segment based upon a prediction of whether the current segment traverses an asymptote within the visible range. The method may further include displaying on a graphical user interface of a computing device, a graph of the segments of the geometric form in the visible range, the graph not including those segments that were decided not be drawn.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 3:
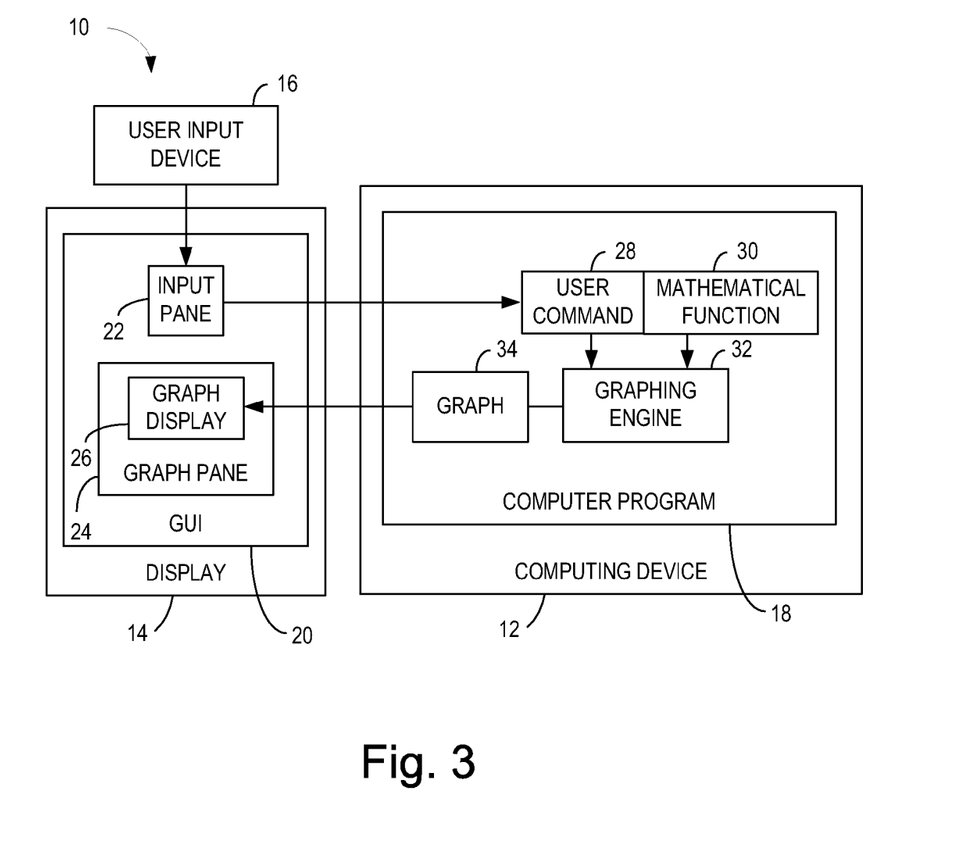
FIG. 3 is schematic view of one embodiment of a system 10 for identifying asymptotes in an approximated geometric form.

FIG. 3 illustrates a system 10 for identifying asymptotes in an approximated geometric form. System 10 typically includes a computing device 12 and an associated display 14 and user input device 16, such as a mouse, keyboard, keypad, touch screen, stylus, etc. Computing device 12 is configured to execute a computer program 18, via a processor of the computing device, which uses portions of volatile and/or non-volatile memory. Computing program 18 is a computer program executable on the computing device to display a graphical user interface (GUI) 20 having a user input pane 22, and a graph pane 24 with a graph display 26 configured to display a visible area of a graph.

The input pane 22 is typically configured to receive a user command 28 to graph a mathematical function 30, and to send the user command 28 and associated mathematical function 30 to a graphing engine 32. The graphing engine 32 is configured to execute the user command 28 to perform calculations to graph the mathematical function 30, within a visible range to be displayed. The resulting graph 34 is sent from the graphing engine to be displayed on the graph display 26 of the graph pane 24 of GUI 20.

Figure 4:
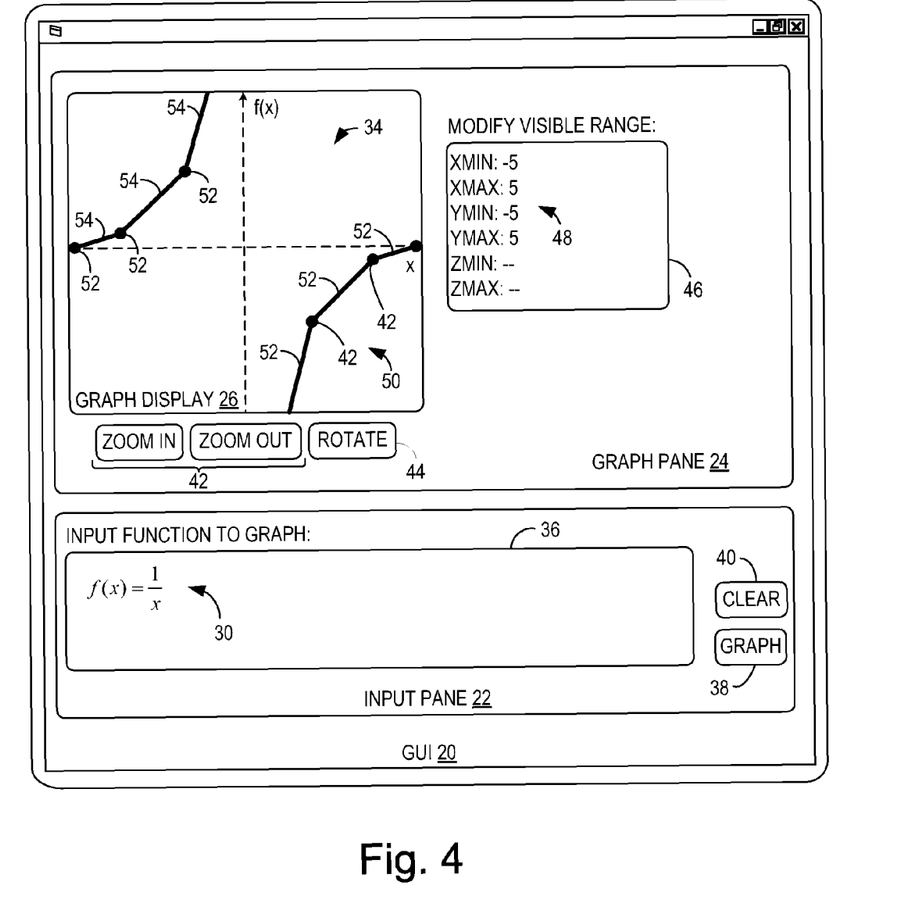
FIG. 4 is a schematic view of a graphical user interface of the system of FIG. 3.

FIG. 4 illustrates one possible embodiment of GUI 20. A user may enter mathematical function 30, such as $f(x)=1/x$ the illustrated example, into text input box 36, and then choose the graph command selector 38 to send the user command 28 and inputted mathematical function 30 to the graphing engine 32 for processing. The resulting graph 34 is displayed in graph display 26. A clear selector 40 may be provided to clear the input in text input box 36 prior to entering another function.

The visible range for the graph display 26 may be adjusted by the user via zoom selectors 42 and rotate selector 44, or via visible range input box 46 configured to receive visible range parameters 48. The computer program may be configured to receive user input from one or more of these selectors indicating the visible range for the graph, and adjust the graph display 26 accordingly.

The graphing engine 32 is configured to calculate an approximated geometric form 50 of the mathematical function 30. Such approximate obviates the necessity to calculate an exact solution of the function for each pixel in the display, saving time in rendering the graph. To make this approximation, the graphing engine 32 is configured to identify a set of data points 52 that represent the approximated geometric form 50 of the mathematical function 30. The data points 52 may be organized into segments 54 of the approximated geometric form 50.

After determining a visible range of the approximated geometric form 50 to display, the graphing engine 32 is configured to loop through successive segments 54 of the approximated geometric form 50 of the mathematical function 30 to determine whether each segment is within the visible range and thus should be displayed on the graph display 26. On each loop, for a current segment 54, the graphing engine is configured to make a decision whether to draw the current segment based upon a prediction of whether the current segment traverses an asymptote within the visible range. Once the determination is made for all relevant segments, the graphing engine is configured to display on the GUI, graph 34 including the segments 54 of the approximated geometric form 50 in the visible range. The graph 34 typically does not include those segments that were decided not be drawn.

The graphing engine 32 may be configured to make the decision whether to draw the current segment as follows. Upon determining that all data points of the current segment are outside a visible range for the graph, the graphing engine 32 may be configured to make a decision not to draw the current segment in the graph. Upon determining that a first data point of the current segment is outside a visible range for the graph and a second data point of the current segment is inside the visible range of the graph, the graphing engine 32 may be configured to determine that the first and second data points are on opposite sides of a predetermined point, such as a midpoint, of the visible range for the function, and if so make a decision not to draw the current segment in the graph, else make a decision to draw the current segment. Further, upon determining that all the data points of the current segment are within the visible range, the graphing engine may be configured to apply a heuristic technique to decide whether or not to draw the current segment. The detailed functioning of the graphing engine 32, including examples of suitable heuristic techniques that may be employed, are further explained in relation to the methods discussed below.

Figure 5:
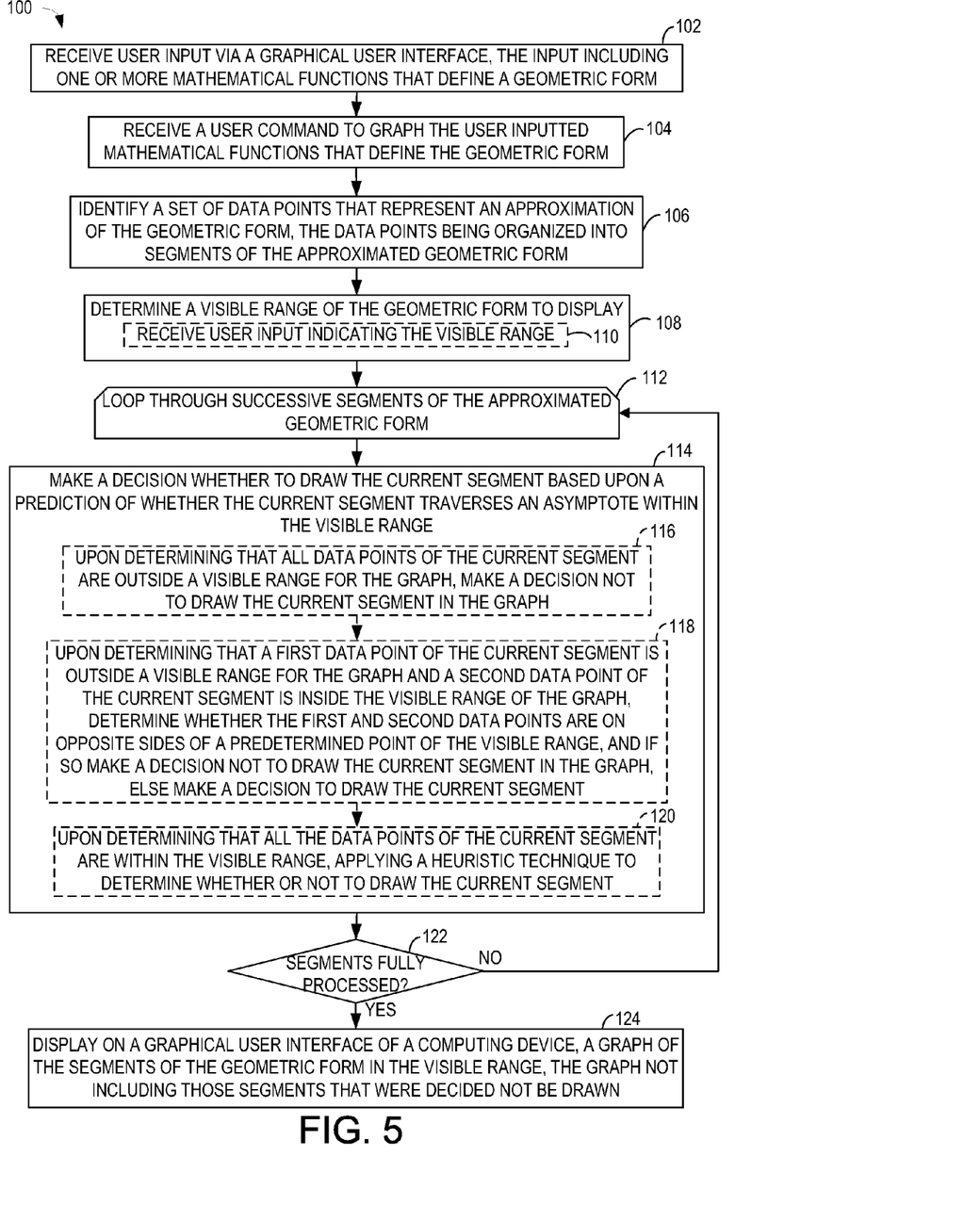
FIG. 5 is a flowchart of one embodiment of a method 100 for identifying asymptotes in an approximated geometric form.

FIG. 5 illustrates one embodiment of a method 100 for identifying asymptotes in an approximated geometric form. At 102, the method typically includes receiving user input via a graphical user interface of a computing device, the input including one or more mathematical functions that define the geometric form. The input may be received, for example, via a GUI input mechanism such as the input pane 22 described above. At 104, the method may include receiving a user command to graph the user inputted mathematical functions that define the geometric form. The mathematical functions may be expressed as a single equation, or as a plurality of parametric equations, and may be in polar or Cartesian coordinate systems.

At 106, the method may include identifying a set of data points that represent an approximated geometric form, the data points being organized into segments of the approximated geometric form. The set of data points approximating the geometric form may include non-visible data points obtained by adaptive sampling in a vicinity of a possible asymptote. Adaptive sampling to add data points in regions of suspected asymptotes can increase the accuracy of the rendered graph in regions around the asymptote. The method may be applied to both curves and surfaces. In the case where the geometric form is a curve, the segments are typically line segments. Where the geometric form is a surface, the segments are typically polygons that approximate the surface.

At 108, the method may include determining a visible range of the geometric form to display. As shown at 110, determining a visible range may include receiving a user input indicating the visible range for the graph of the geometric form. The user input for the visible range may be received, for example, via a GUI input mechanism such zoom selectors 42, rotate selector 44, and/or a visible range input box 46, as described above.

At 112, the method may include looping through successive segments of the approximated geometric form. At 114, on each loop, for a current segment, the method may further include making a decision whether to draw the current segment based upon a prediction of whether the current segment traverses an asymptote within the visible range. Example sub-steps that may be used to make this prediction are illustrated at 116-120, described below.

Figure 6:
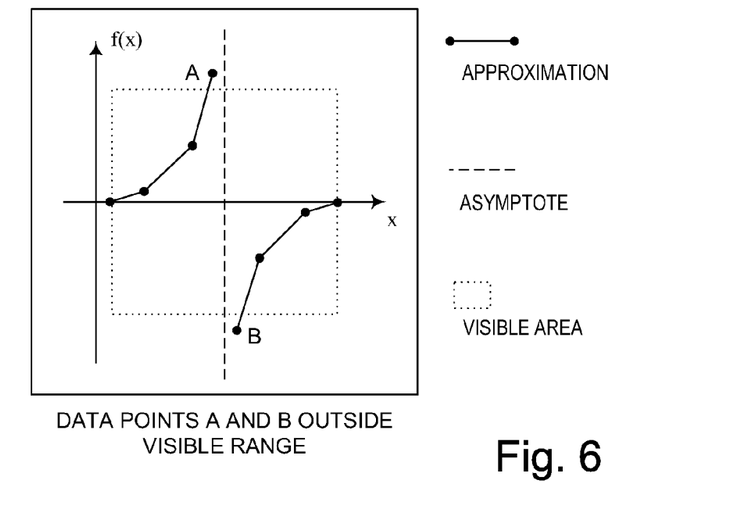
FIG. 6 is a graph produced by the method of FIG. 5, in which data points A and B are both outside a visible range of the graph.

As illustrated at 116, making the decision whether to draw the current segment may include, upon determining that all data points of the current segment are outside a visible range for the graph, making a decision not to draw the current segment in the graph. A representative graph produced by such a determination is shown in FIG. 6, in which data points A and B are both outside a visible range of the graph. It will be appreciated that this step relates to NO determinations at steps 208 and 210 in FIG. 9, and a NO determination at step 308 in FIG. 11.

Figure 7:
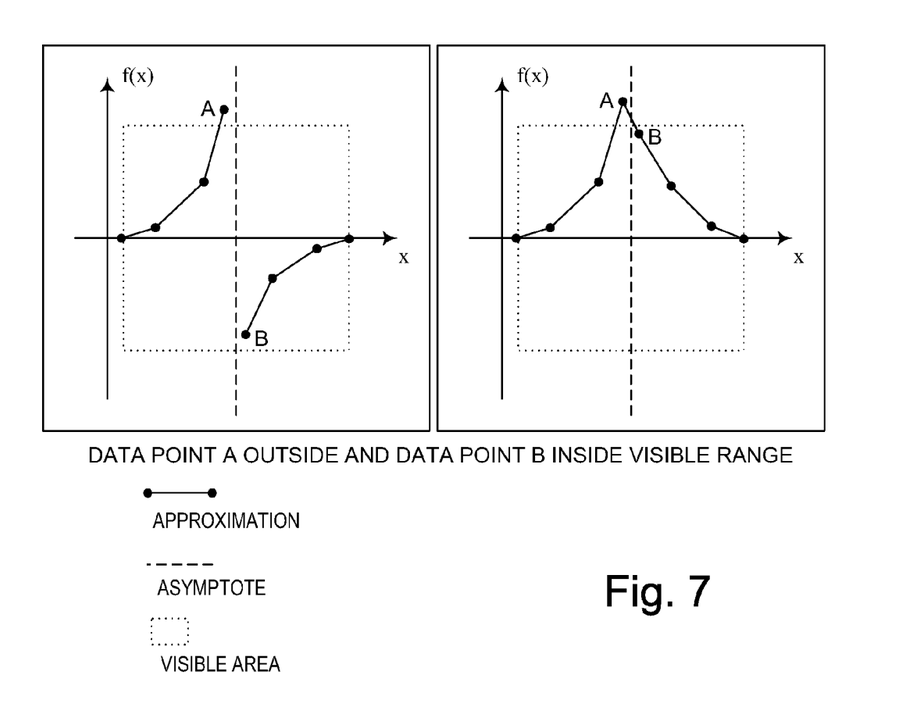
FIG. 7 shows two graphs produced by the method of FIG. 5, in each of which a respective data point A is outside and a respective data point B is inside a visible range of the graph.

As illustrated at 118, making the decision whether to draw the current segment may also include, upon determining that a first data point of the current segment is outside a visible range for the graph and a second data point of the current segment is inside the visible range of the graph, determine that the first and second data points are on opposite sides of a midpoint of the visible range for the function, and if so make a decision not to draw the current segment in the graph, else make a decision to draw the current segment. Representative graphs produced by such a determination are shown in FIG. 7. In each of the graphs of FIG. 7 a respective data point A is outside and a respective data point B is inside a visible range of the graph. It will be appreciated that this step relates to a YES determination at step 208 and a NO determination at step 214 in FIG. 9, a NO determination at step 208 and a YES determination at step 210 in FIG. 9, and a NO determination at step 308 and a NO determination at step 314 in FIG. 11.

Figure 8:
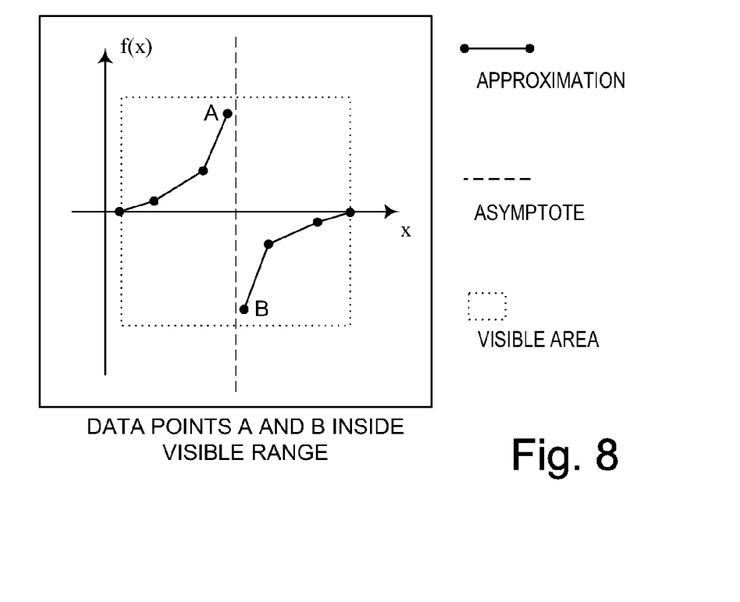
FIG. 8 is a graph produced by the method of FIG. 5, in which data points A and B are both inside a visible range of the graph.

Further, as illustrated at 120, making the decision whether to draw the current segment may include, upon determining that all the data points of the current segment are within the visible range, applying a heuristic technique to decide whether or not to draw the current segment. A representative graph produced by such a determination is shown in FIG. 8, in which data points A and B are both inside a visible range of the graph. It will be appreciated that this step relates to a YES determinations at 208 and 214 of FIG. 9, and YES determinations at 308 and 314 of FIG. 11.

The heuristic technique applied at step 120 may include comparing one or more characteristics of a first adjacent segment of the geometric form that includes the first data point, and a second adjacent segment of the geometric form that includes the second data point. The characteristics may include, for example, a location of each of the first adjacent segment and second adjacent segment, a slope of each of the first adjacent segment and second adjacent segment, and/or a distance of each of the first adjacent segments and second adjacent segment. In another example, the heuristic technique may include as follows: if it is determined that the first data point and second data point are on opposite sides of a midpoint of the visible range, and if it is further determined that that the first adjacent segment and second adjacent segments have respective slopes that trend in opposite directions, then making a decision not to draw the current segment.

At 122, the method may include determining whether all relevant segments have been fully processed. If not, the method returns to loop through steps 112-120. Once it is determined at 122 that all segments have been processed, the method proceeds to, at 124, display on a graphical user interface of a computing device, a graph of the segments of the approximated geometric form in the visible range, the graph not including those segments that were decided not be drawn. In this manner, by predicting which segments cross asymptotes and not drawing them, the errors associated with the prior art shown in FIGS. 1 and 2 may be inhibited.

Figure 9:
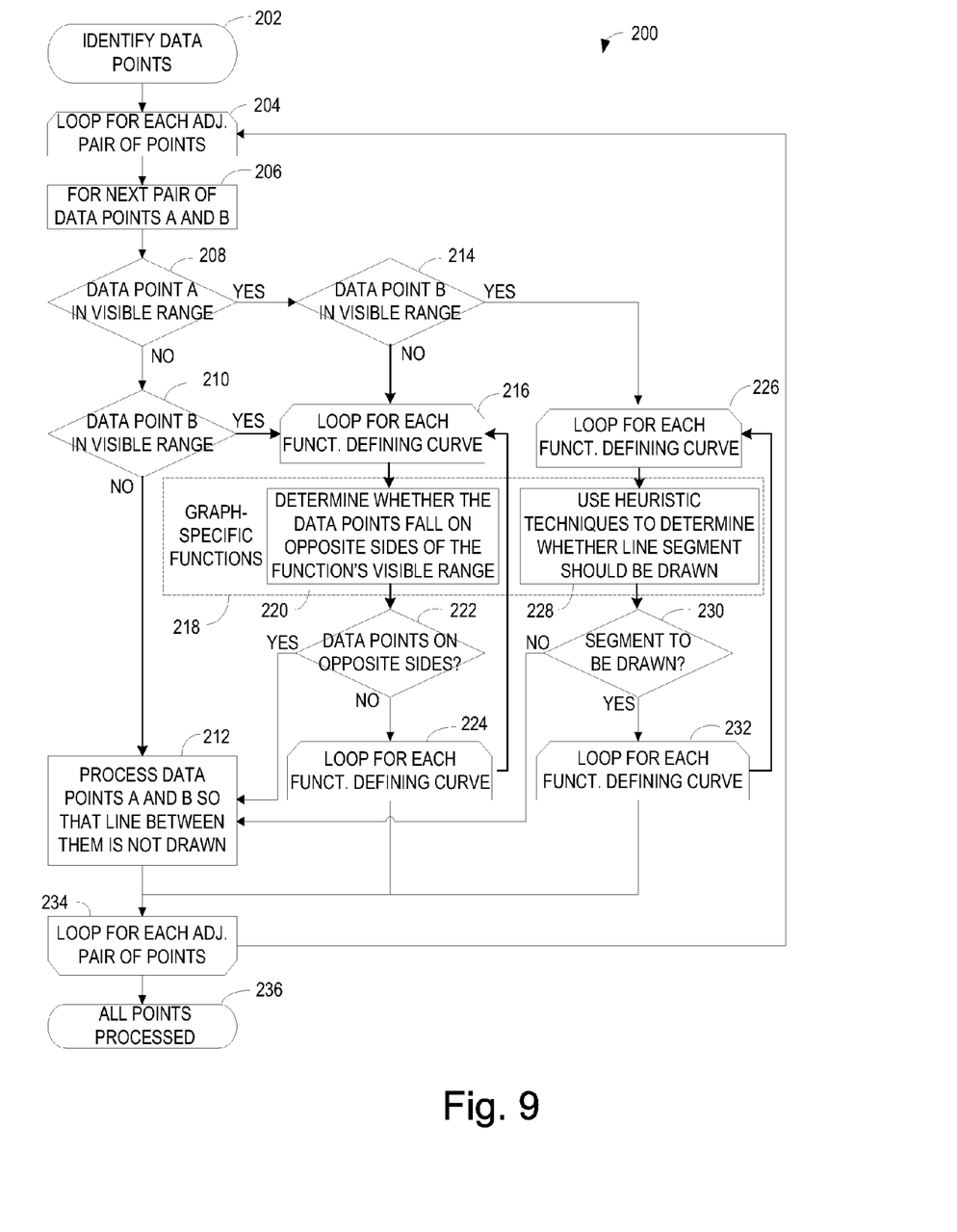
FIG. 9 is a flowchart of another embodiment of a method for identifying asymptotes in an approximated two-dimensional geometric form.

FIG. 9 illustrates another embodiment of a method 200, which may be applied to identify asymptotes in an approximated two-dimensional geometric form. Method 200 typically includes, at 202 identifying a set of data points that define an approximated curve, the points defining a plurality of intermediate line segments that form the approximated curve. At 204, the method includes looping for each adjacent pair of points. At 206, points A and B are defined to be the next two adjacent points in the approximated curve. At 208, it is determined whether data point A is in a visible range to be displayed. If NO, the method proceeds to step 210, where it is determined whether the data point B is in the visible range to be displayed. If NO, then it has been determined that no data points lie within the visible range, and thus the method proceeds to step 212 and the current line segment formed between data points A and B is processed not to be drawn.

If the outcome of the determination at 208 is YES, then the method proceeds to 214, where it is determined whether the data point B is within a visible range to be displayed. If the outcome at 214 is NO, or alternatively if the outcome of the determination at 210 is YES, then method has determined that one of the data points is outside the visible range and one of the data points is inside the visible range, and in either case, the method proceeds to step 216. At 216, the method loops through each function defining the curve, and performs certain graph specific functions 218 to determine whether the line segment joining points A and B should be drawn.

Specifically, at 220, the method may include determining whether points A and B are on opposites sides of a predetermined point, such as a midpoint, within the visible range. At 222, if the data points A and B are determined to be on opposite sides, the method proceeds to step 212, and the current line segment formed between these points is processed not to be drawn. If, at 222, the data points are not determined to be on opposite sides of the predetermined point, then at 224, the method proceeds to loop for each function defining the curve. If, for all functions defining the curve, it is determined at 222 that the points A and B are not on opposite sides of the predetermined point, then the method proceeds out of the loop at 224 to step 234, and further to loop back to step 204 for the next pair of adjacent data points.

On the other hand, if at 214, the outcome is YES, then the method has determined that all points of the current segment are within the visible range. The method then proceeds to step 226, and loops for each function defining the curve, to perform at 228 one or more heuristic techniques to determine whether the segment should be drawn. Example heuristic techniques that may be used are described above with reference to step 120 of FIG. 5, and will not be redescribed for the sake of brevity. At 230, if it is determined by the heuristic technique that the segment should not be drawn, then the method proceeds to 212, and the segment is processed not to be drawn. If the outcome of 230 is NO, then at 232 the method loops back to 226 until all functions that define the curve have been processed, at which stage the method proceeds to step 234, and then loops back to step 204 for the next pair of adjacent data points. The method continues until, at 236, it is determined that all the data points have been processed. It will be appreciated that the output of the method 200 may be displayed as a graph in which segments associated with all data points in the visible range, except those marked not to be drawn by method 200, are displayed, similar to step 124 described above.

Figure 10:
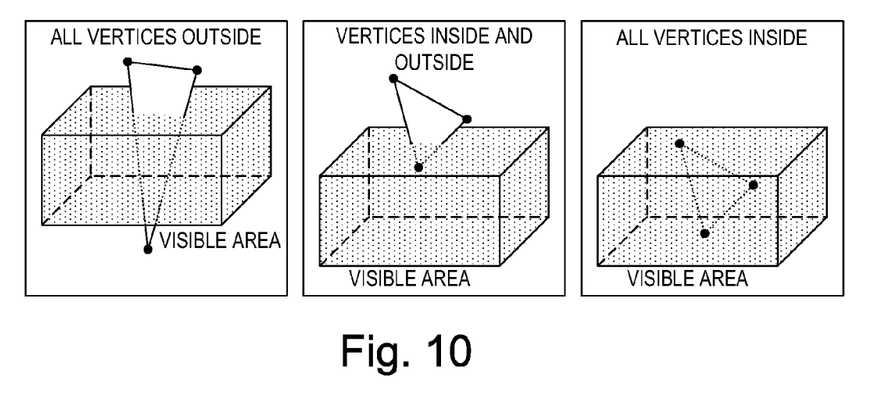
FIG. 10 is a schematic illustration of data points falling inside, outside, and both inside and outside a visible range of a three-dimensional graph.
Figure 11:
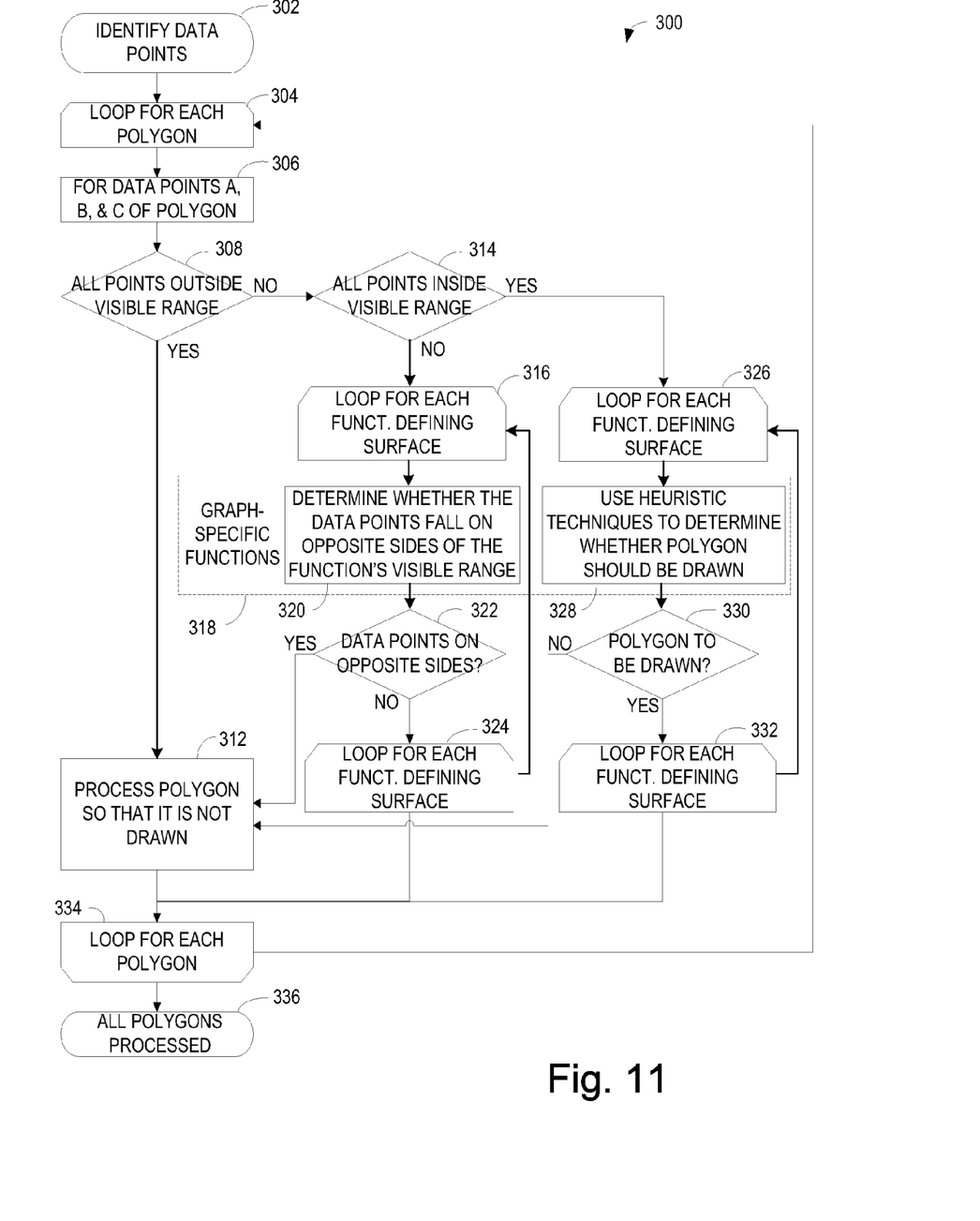
FIG. 11 is a flowchart of another embodiment of a method for identifying asymptotes in an approximated three-dimensional geometric form.

FIGS. 10 and 11 illustrate in detail application of the systems and methods described herein to approximated three-dimensional geometric forms, which may be surfaces represented as a mesh of polygons that approximate an actual mathematical function. As shown in FIG. 10, each polygon in the mesh may be determined to be one of three states: all data point vertices are outside a visible range of the graph to be displayed, one or more data point vertices are inside and one or more data point vertices are outside the visible range, and all data point vertices are inside the visible range. These three cases are identified and processed differently according to the method of FIG. 11.

FIG. 11 illustrates a method 300 according to another embodiment, which may be applied to identify asymptotes in such an approximated three-dimensional geometric form. It will be appreciated that similar steps in FIGS. 10 and 11 are similarly numbered.

Method 300 typically includes, at 302 identifying a set of data points that define an approximated surface, the points defining a plurality of interconnected polygons that form a mesh approximating the surface. At 304, the method includes looping for each polygon in the mesh. At 306, points A, B, and C are defined to be the vertices of the current polygon. At 308, it is determined whether all data points A, B, and C are outside a visible range to be displayed. If YES, the method proceeds to step 312, and the current polygon is processed not to be drawn.

If the outcome of the determination at 308 is NO, then the method proceeds to 314, where it is determined whether all data points A, B, and C lie inside the visible range. If the outcome at 314 is NO, then method has determined that one of the data points is outside the visible range and one of the data points is inside the visible range, and thus proceeds to step 316. At 316, the method loops through each function defining the surface, and performs certain graph specific functions 318 to determine whether the current polygon should be drawn.

Specifically, at 320, the method may include determining whether points A, B, and/or C fall on opposite sides of a predetermined point, such as a midpoint, within the visible range. At 322, if at least some of the data points are determined to be on opposite sides, the method proceeds to step 312, and the current polygon is processed not to be drawn. If, at 322, the data points are not determined to be on opposite sides of the predetermined point, then at 324, the method proceeds to loop for each function defining the surface. If, for all functions defining the surface, it is determined at 322 that the data points A, B, and C of the current polygon are not on opposite sides of the predetermined point, then the method proceeds out of the loop at 324 to step 334, and further to loop back to step 304 for the polygon.

On the other hand, if at 314, the outcome is YES, then the method has determined that all points of the current polygon are inside the visible range. The method then proceeds to step 326, and loops for each function defining the surface, to perform, at 328, one or more heuristic techniques to determine whether the polygon should be drawn. Example heuristic techniques that may be used are described above with reference to step 120 of FIG. 5, and will not be redescribed for the sake of brevity. At 330, if it is determined by the heuristic techniques that the polygon should not be drawn, then the method proceeds to 312, and the polygon is processed not to be drawn. If the outcome of 330 is NO, then at 332 the method loops back to 326 until all functions that define the curve have been processed, at which stage the method proceeds to step 334, and further loops back to step 204 for the next polygon. The method continues until, at 336, it is determined that all polygons have been processed. It will be appreciated that the output of the method 300 may be displayed as a graph in which all polygons in the visible range, except those polygons marked not to be drawn by method 300, are displayed, similar to step 124 described above.

The systems and method described above may be used to efficiently and accurately draw graphs of approximated geometric forms, including curves and surfaces, and inhibit the erroneous display of graph portions that cross asymptotes that exist in the actual mathematical function.

It will be appreciated that the computing devices described herein may be any suitable computing device configured to execute the programs and display the graphical user interfaces described herein. For example, the computing devices may be a personal computer, graphing calculator, laptop computer, portable data assistant (PDA), computer-enabled wireless telephone, networked computing device, or other suitable computing device, and may be connected to each other via computer networks, such as the Internet. These computing devices typically include a processor and associated volatile and non-volatile memory, and are configured to execute programs stored in non-volatile memory using portions of volatile memory and the processor. As used herein, the term "program" refers to software or firmware components that may be executed by, or utilized by, one or more computing devices described herein, and is meant to encompass individual or groups of executable files, data files, libraries, drivers, scripts, database records, etc. It will be appreciated that computer-readable media may be provided having program instructions stored thereon, which upon execution by a computing device, cause the computing device to execute the methods described above and cause operation of the systems described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A method for identifying asymptotes in an approximated geometric form, the method comprising:
   identifying a set of data points that represent an approximated geometric form, the data points being organized into segments collectively approximating a shape of the approximated geometric form, the segments being straight line segments or polygon segments, and the data points forming end points of the straight line segments or vertices of the polygon segments;
   determining a visible range of the geometric form to display;
   looping through successive segments of the approximated geometric form, and on each loop, for a current segment:
      making a decision whether to draw the current segment based upon a prediction of whether the current segment traverses an asymptote within the visible range, wherein the decision whether to draw the current segment is accomplished at least in part by:
         upon determining that a first data point of the current segment is outside the visible range and a second data point of the current segment is inside the visible range, determining whether the first and second data points are on opposite sides of a midpoint of the visible range, and if so making a decision not to draw the current segment, else making a decision to draw the current segment,
         upon determining that all the data points of the current segment are within the visible range, applying a heuristic technique to decide whether to draw the current segment including if it is determined that the first and second data points are on opposite sides of the midpoint of the visible range, and if it is further determined that that a first adjacent segment and a second adjacent segment have respective slopes that trend in opposite directions, then making a decision not to draw the current segment, else making a decision to draw the current segment; and
   displaying on a graphical user interface of a computing device, a graph of the segments of the approximated geometric form in the visible range, the graph not including those segments that were decided not to be drawn.

2. The method of claim 1, making the decision whether to draw the current segment, further includes:
   upon determining that all data points of the current segment are outside a visible range for the graph, making a decision not to draw the current segment in the graph.

3. The method of claim 1, wherein the heuristic technique further includes comparing one or more characteristics of the first adjacent segment of the geometric form that includes the first data point, and the second adjacent segment of the geometric form that includes the second data point.

4. The method of claim 3, wherein the characteristics include a location of each of the first adjacent segment and second adjacent segment.

5. The method of claim 3, wherein the characteristics include a slope of each of the first adjacent segment and the second adjacent segment.

6. The method of claim 3, wherein the characteristics include a distance of each of the first adjacent segment and the second adjacent segment.

7. The method of claim 1, wherein the set of data points approximating the geometric form includes non-visible data points obtained by adaptive sampling in a vicinity of a possible asymptote.

8. The method of claim 1, wherein the geometric form is a curve and the segments are line segments that collectively approximate the shape of the curve.

9. The method of claim 1, wherein the geometric form is a curved surface and the segments are polygon segments that approximate the curved surface.

10. The method of claim 1, further comprising, prior to identifying, receiving user input via the graphical user interface of the computing device, the input including one or more mathematical functions that define the geometric form.

11. The method of claim 10, wherein the one or more mathematical functions are selected from a group consisting of a single equation and a plurality of parametric equations.

12. The method of claim 10, further comprising, receiving a user command to graph the user inputted one or more mathematical functions that define the geometric form.

13. The method of claim 1, wherein determining a visible range of the geometric form to display includes receiving a user input indicating the visible range for the graph of the geometric form.

14. A system for identifying asymptotes in an approximated geometric form, the system comprising:
a computer program executable on a computing device, the computer program having a graphical user interface configured to receive a user command to graph a mathematical function, the computer program further having a graphing engine being configured to execute the user command to graph the mathematical function by identifying a set of data points that represent an approximated geometric form of the mathematical function, the data points being organized into segments that collectively approximate a shape of the approximated geometric form, the segments being straight line segments or polygon segments, and the data points forming end points of the straight line segments or vertices of the polygon segments, determining a visible range of the geometric form to display, looping through successive segments of an approximated geometric form of the mathematical function, and on each loop, for a current segment, making a decision whether to draw the current segment based upon a prediction of whether the current segment traverses an asymptote within the visible range, wherein the decision whether to draw the current segment is accomplished at least in part by: upon determining that a first data point of the current segment is outside the visible range and a second data point of the current segment is inside the visible range, determining whether the first and second data points are on opposite sides of a midpoint of the visible range, and if so making a decision not to draw the current segment, else making a decision to draw the current segment, upon determining that all the data points of the current segment are within the visible range, applying a heuristic technique to decide whether to draw the current segment including if it is determined that the first and second data points are on opposite sides of the midpoint of the visible range, and if it is further determined that that a first adjacent segment and a second adjacent segment have respective slopes that trend in opposite directions, then making a decision not to draw the current segment, else making a decision to draw the current segment, and displaying on the graphical user interface of the computing device, a graph of the segments of the approximated geometric form in the visible range, the graph not including those segments that were decided not to be drawn.

15. A computer readable storage device holding instructions executable by a computing device to:
identify a set of data points that represent an approximated geometric form, the data points being organized into segments that collectively approximate a shape of the approximated geometric form, the segments being straight line segments or polygon segments, and the data points forming end points of the straight line segments or vertices of the polygon segments;
determine a visible range of the approximated geometric form to display;
loop through successive segments of the approximated geometric form, and on each loop, for a current segment:
upon determining that all data points of the current segment are outside a visible range, make a decision not to draw the current segment;
upon determining that a first data point of the current segment is outside the visible range and a second data point of the current segment is inside the visible range, determine whether the first and second data points are on opposite sides of a midpoint of the visible range, and if so make a decision not to draw the current segment, else make a decision to draw the current segment; and
upon determining that all the data points of the current segment are within the visible range, apply a heuristic technique to decide whether or not to draw the current segment including if it is determined that the first and second data points are on opposite sides of the midpoint of the visible range, and if it is further determined that that a first adjacent segment and a second adjacent segment have respective slopes that trend in opposite directions, then make a decision not to draw the current segment, else make a decision to draw the current segment; and
display on a graphical user interface of the computing device, a graph of the segments of the approximated geometric form in the visible range, the graph not including those segments that were decided not to be drawn.

* * * * *